United States Patent [19]

Bidgood et al.

[11] 4,246,800

[45] Jan. 27, 1981

[54] STROBED POWER SUPPLY FOR AN ULTRASONIC MEASURING INSTRUMENT

[75] Inventors: William E. Bidgood, Glendora; John D. Klarin, San Pedro, both of Calif.

[73] Assignee: Envirotech Corporation, Menlo Park, Calif.

[21] Appl. No.: 87,859

[22] Filed: Oct. 24, 1979

[51] Int. Cl.³ .............................................. G01F 1/05
[52] U.S. Cl. ................................. 73/861.27; 330/297; 73/861.28
[58] Field of Search ........... 73/861.28, 861.18, 861.23, 73/861.25, 861.19, 861.27, 861.29, 861.26, 861.21, 861.22, 861.31; 330/202, 297; 323/DIG. 1

[56] References Cited

U.S. PATENT DOCUMENTS

| 3,522,580 | 8/1970 | Lynch | 73/861.27 |
| 4,213,099 | 7/1980 | Brown | 330/202 |

*Primary Examiner*—Gerald Goldberg
*Assistant Examiner*—Denis E. Corr

*Attorney, Agent, or Firm*—Robert E. Krebs; Hal J. Bohner

[57] ABSTRACT

In a measuring instrument for obtaining information about a medium through which ultrasonic signals can be transmitted or from which ultrasonic signals can be reflected, transducers (21 and 22) are provided for sending and receiving the ultrasonic signals. Electronic amplification means (25) is provided to amplify received ultrasonic signals to a level suitable for processing by a signal processor (23) to provide the desired information. A power supply (20) is provided for activating the sending and receiving transducers (21 and 22) and the amplification means (25). Strobe switching means (26) is provided for activating the power supply (20) during periodic intervals, leaving intervening spans of time when the power supply (20) is inactive. Capacitive means (32) is provided for activating the amplification means (25) when the power supply (20) is inactive, thereby precluding electronic noise generated by the power supply (20) from establishing a gain limit for the amplification means (25).

19 Claims, 1 Drawing Figure

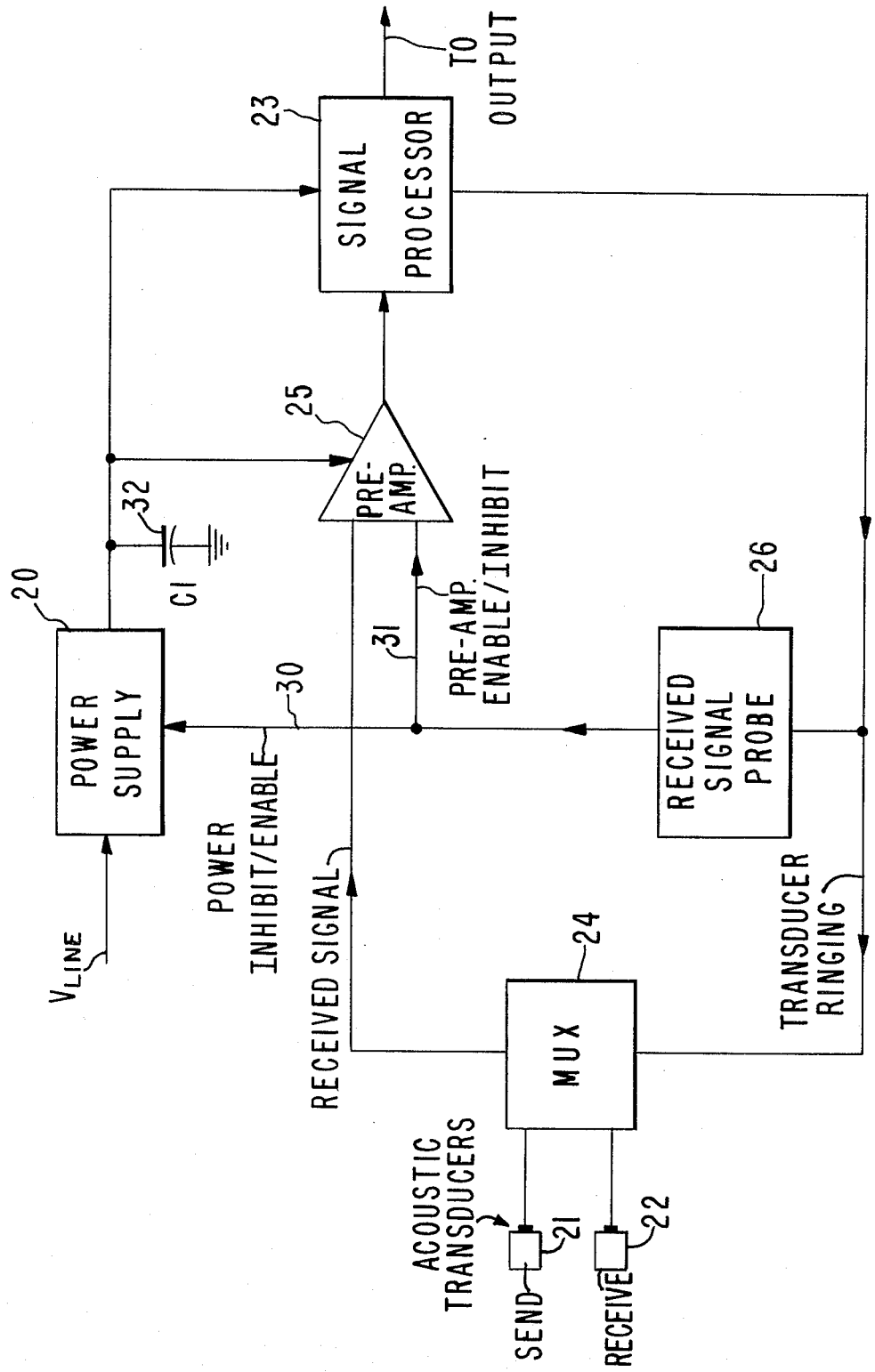

STROBED POWER SUPPLY FOR AN ULTRASONIC MEASURING INSTRUMENT

BACKGROUND OF THE INVENTION

1. Field of the Invention

This invention pertains generally to ultrasonic measuring instruments, with particular relevance to ultrasonic flowmeters.

2. State of the Art

An ultrasonic measuring instrument typically comprises sending and receiving transducers, which are placed on opposite sides of an object or material for which a measurement is to be made. Changes that occur in certain characteristics of ultrasonic pulses transmitted through the object or material from one transducer to the other can provide information indicative of certain properties of the object or material. Such information is quantified form can provide useful measurements.

By way of example, ultrasonic flowmeters are commercially available for measuring changes in flow rate of a fluid flowing through a conduit. Sending and receiving transducers positioned on opposite sides of the conduit enable ultrasonic pulses to be transmitted through the flowing fluid from one transducer to the other. The transducers may be multiplexed to reverse the direction of the pulses according to the requirements or capabilities of the particular instrument. Changes in time-of-flight of the ultrasonic pulses from one transducer to the other through the flowing fluid can be correlated with changes in flow rate of the fluid in accordance with well-known principles, a discussion of which can be found in *Flow, Its Measurement and Control in Science and Industry*, Volume 1, pages 897–957, written by J. L. McShane et al. and published in 1974 by Instrument Society of America, Pittsburgh, Pennsylvania.

Many objects and materials attenuate to a considerable extent the energy in ultrasonic pulses passing therethrough or reflected therefrom. When ultrasonic pulses are transmitted through a fluid, the fluid itself and/or suspended solids carried by the fluid can oftentimes severely attenuate the energy in the pulses. If attenuation of ultrasonic pulses passing through or reflected from a medium is severe enough, coherent pulse signals cannot be detected. The precision with which an ultrasonic measuring instrument can measure small changes in a particular variable is generally dependent upon the sensitivity of the instrument in detecting coherent pulse signals transmitted through or reflected from the medium being investigated.

With ultrasonic measuring instruments of the prior art, the adverse effect of energy attenuation in pulses transmitted through or reflected from a medium was usually overcome by either increasing the energy of the pulses emitted into the medium, or increasing the sensitivity of electronic amplification means for detecting the pulses transmitted through or reflected from the medium. The use of high-gain receiving amplifiers in circuits employing receiving transducers for detecting highly attenuated ultrasonic pulses transmitted through or reflected from objects and materials was a well-known expedient in the prior art.

Historically, the high-gain limit of a receiving amplifier for an ultrasonic measuring instrument was determined by the electronic noise generated by the power supply used to activate the instrument.

OBJECTS OF THE INVENTION

It is an object of the present invention to provide an ultrasonic measuring instrument having a sensitivity that is substantially uneffected by electronic noise generated by the power supply that activates the instrument.

A particular object of the present invention is to provide an ultrasonic flowmeter having a high-gain receiving amplifier for detecting ultrasonic signals transmitted through a flowing fluid, where the high-gain limit of the receiving amplifier is substantially uneffected by power supply noise.

A feature of the present invention is a strobed power supply, which cuts off power to the receiving amplifier of an ultrasonic measuring instrument while the receiving amplifier is being operated in the receiving mode.

The present invention is generally applicable to ultrasonic measuring instruments in which very high-gain circuits are required to operate for very short time intervals, where power supply noise is a significant factor in limiting the gain of the circuits. By improving the sensitivity of receiving amplifiers in such instruments, the present invention enables ultrasonic measurements to be made with greater precision than was possible in the prior art.

The present invention may be used to particular advantage in an ultrasonic flowmeter of either the transmissive type or the reflective (i.e., Doppler) type, where the amplitudes of acoustic pulses detectable by a receiving amplifier are small enough to be masked by the higher amplitudes of the power supply noise. By electrically isolating the receiving amplifier from the power supply when the instrument is operating in the receiving mode, the present invention provides a much higher ratio of received signal to power supply noise than was possible in the prior art. Thus, the present invention allows ultrasonic measuring instruments, particularly ultrasonic flowmeters, to use receiving amplifiers of much higher gain than was possible in the prior art.

The present invention enables ultrasonic flowmeter measurements to be made on process fluids for which the acoustic signal attenuation is extremely high. Thus, the present invention enables implementation of process control techniques involving fluids that had heretofore not been readily amenable to ultrasonic flow measurement.

DESCRIPTION OF THE DRAWING

The drawing FIGURE is a block diagram of electronic circuitry for implementing the present invention.

DESCRIPTION OF THE PREFERRED EMBODIMENT

The electronic circuitry 10 shown in the drawing connects a power supply 20 to sending transducer 21 and receiving transducer 22 and to a signal processor 23. The transducers 21 and 22 are representative generally of the transducers of ultrasonic measuring instruments, and each transducer shown may represent an array of more than one transducer depending upon the purposes and capabilities of the particular instrument.

In some instruments, the transducers 21 and 22 may be dedicated as sending and receiving transducers, respectively. However, in other instruments, the transducers 21 and 22 may advantageously be multiplexed by means of a multiplexer 24 as indicated by the block containing the letters MUX in the drawing. The multiplexer 24 is not necessary to the invention, and would exist only in an instrument in which each of the transducers 21 and 22 alternates as a sending and receiving transducer with one transducer operating in the receiving mode while the other is operating in the sending mode. An instrument employing only a single transducer, which functions alternately as a sending transducer and as a receiving transducer, could also utilize the circuitry 10 of the present invention.

As shown in the drawing, the power supply 20 typically converts line voltage ($V_{line}$) to well-regulated d.c. voltages for activating the transducers 21 and 22 and the signal processor 23. The output of the power supply 20 inherently includes a "ripple" component due to the inability of the power supply 20 to filter full-wave rectified d.c. voltages perfectly. Furthermore, the power supply 20 radiates r.f. noise due to the generation of d.c. voltage pulses and due to switching that occurs through isolation transformers in the power supply 20.

The signal processor 23 generates an electrical output in response to an input that is initiated upon receipt by the receiving transducer 22 of pulsed ultrasonic signals that have been transmitted through or reflected from the medium under investigation. As shown in the drawing, the pulsed signals received by the receiving transducer 22 are detected by a preamplifier 25, which amplifies low-energy (i.e., highly attenuated) received signals to usable levels. The amplified signals from the preamplifier 25 serve as the input to the signal processor 23, which processes the amplified signals to produce an output based upon one or more meaningful characteristics (e.g., frequency, amplitude, occurrence of a particular waveform, etc.) of the amplified signals. The output from the signal processor 23 is used to provide a quantitative measurement, the nature of which depends upon the kind of instrument being used.

If the preamplifier 25 were to be activated by the power supply 20 while the receiving transducer 22 is being operated in the receiving mode, the high-gain limit of the preamplifier 25 would be determined by the noise level of the power supply 20. However, according to the present invention, a means other than the power supply 20 is used to activate the preamplifier 25 when the receiving transducer 22 is being operated in the receiving mode. In this way, the high-gain limit of the preamplifier 25 is independent of power supply noise.

A strobe switching device 26, which is activated by the power supply 20, generates an ON/OFF output signal to both the power supply 20 and the preamplifier 25. The output signal from the strobe switching device 26 is transmitted via power inhibit/enable line 30 to the power supply 20, and via the preamplifier enable/inhibit line 31 to the preamplifier 25. The ON/OFF output signal from the strobe switching device 26 turns the power supply 20 OFF (i.e., inhibits the power supply 20) when the preamplifier 25 is turned ON (i.e., enabled), and turns the power supply 20 ON (i.e., enables the power supply 20) when the preamplifier 25 is turned OFF (i.e., inhibited). For certain instruments, it is advantageous to inhibit the power supply 20 for an interval of time beginning before the preamplifier 25 is enabled. The ON/OFF output signal from the strobe switching device 26 is generated periodically during pulse intervals between the activation (or "ringing") of the sending transducer 21, and enables the preamplifier 25 and the receiving transducer 22 to be activated when the sending transducer 21 is inactive.

In a typical ultrasonic flowmeter of the transmissive type, the time-of-flight of an acoustic pulse through a medium under investigation is in the range from 100 microseconds to 1000 microseconds, while the time interval between two consecutive acoustic pulses is in the range from 3000 to 6000 microseconds. Thus, the time interval between two consecutive pulses generated by an acoustic flowmeter is generally very long in comparison with the time-of-flight of the pulses. Therefore, residual ringing of the acoustic transmitting transducer can be completely dissipated before the receiving transducer is activated.

According to the present invention, a power line filter capacitor 32 is provided to store enough d.c. energy to power the components of the circuitry 10 during the spans of time when the power supply 20 is turned OFF. In particular, the capacitor 32 is able to store enough electric charge to provide power to the preamplifier 25, signal processor 23 and strobe switching device 26 when the power supply 20 is inhibited (i.e., turned OFF). The capacitor 32 shown in the drawing may represent a number of power line filter capacitors, i.e., at least one capacitor for every secondary winding or regulated voltage lead from the power supply 20.

The polarity on the power inhibit/enable line 30 is opposite the polarity on the preamplifier enable/inhibit line 31, so that the preamplifier 25 cannot be operated in the receiving mode when the power supply 20 is activated. When the power supply 20 is inhibited, the line voltage $V_{line}$ is disconnected from the circuitry 10 so that radiated r.f. noise as well as other power supply noises are isolated from the preamplifier 25. At a predetermined time after the acoustic signal has been received by the receiving transducer 22, the strobe switching device 26 changes state to inhibit the preamplifier 25 and turn the power supply 20 back ON, thereby recharging the storage capacitor 32.

Since the electronic noise generated by the power supply 20 does not impose a high-gain limit on the preamplifier 25, the specifications of the preamplifier 25 can be chosen to provide a gain that greatly exceeds the level at which power supply noise would otherwise saturate the preamplifier. Consequently very weak acoustic signals can be detected by the preamplifier 25 and can be amplified coherently to useful levels for processing by the signal processor 23.

The present invention has been described above in terms of particular circuit components. However, other techniques for implementing the present invention could be devised by workers skilled in the art and yet be within the teaching of the invention. The scope of the invention is to be construed from the following claims and their equivalents.

I claim:

1. A method of operating an instrument for providing information about a medium through which ultrasonic signals can be transmitted, said instrument comprising means for sending and receiving said ultrasonic signals, electronic amplification means for amplifying receiving signals to a level suitable for processing to provide said information, a power supply for activating said sending and receiving means and said amplification means, and capacitive means for activating said amplification means when said power supply is deactivated, said method substantially precluding electronic noise generated by said power supply from establishing a gain limit for said amplification means, said method comprising the steps of:
(a) activating said power supply during periodic intervals so as to provide intervening spans of time when said power supply does not generate any substantial electronic noise,
(b) activating said amplification means by said capacitive means for at least a portion of each of said intervening spans of time.

2. The method of claim 1 wherein said means for sending and receiving ultrasonic signals comprises a plurality of ultrasonic transducers, said transducers being dedicated so that at least one transducer functions only as a sending transducer and at least one transducer functions only as a receiving transducer, and wherein the step of activating said amplification means occurs only when at least one dedicated receiving transducer is activated.

3. The method of claim 1 wherein said means for sending and receiving ultrasonic signals comprises two separate ultrasonic transducers.

4. The method of claim 3 wherein each of said separate ultrasonic transducers is dedicated so that one transducer is a sending transducer and the other is a receiving transducer.

5. The method of claim 1 wherein said means for sending and receiving ultrasonic signals comprises an ultrasonic transducer and multiplexing means for operating said transducer alternately as a sending transducer and as a receiving transducer, and wherein the step of activating said amplification means occurs when said transducer is being operated as a receiving transducer.

6. The method of claim 1 wherein said means for sending and receiving said ultrasonic signals comprises separate sending and receiving transducers, and wherein the step of activating said amplification means occurs when said receiving transducer is activated and said sending transducer is inactive.

7. A method for preventing power supply noise from interfering with receiving amplifier gain in an ultrasonic instrument that comprises an ultrasonic signal sending transducer, an ultrasonic signal receiving transducer, a receiving amplifier electrically connecting said receiving transducer to a signal processing means, and circuit means electrically connecting said transmitted and receiving transducers and said receiving amplifier to a power supply, said method comprising the steps of:
(a) deactivating said transmitting transducer during periodic intervals, and deactivating said power supply during at least a portion of each interval when said transmitting transducer is deactivated; and
(b) activating said receiving transducer and said receiving amplifier when said power supply is deactivated so that the gain of said receiving amplifier is not affected by noise attributable to said power supply.

8. The method of claim 7 wherein the deactivation of said power supply causes storage of electrical charge in capacitive components of said circuit means.

9. The method of claim 8 wherein the activation of said receiving transducer and said receiving amplifier is accomplished only by discharge of said capacitive components of said circuit means.

10. An ultrasonic instrument comprising an ultrasonic signal sending transducer, an ultrasonic signal receiving transducer, a receiving amplifier electrically connecting said receiving transducer to a signal processing means, and circuit means electrically connecting said sending and receiving transducers and said receiving amplifier to a power supply, said circuit means including:
switching means for deactivating said sending transducer during periodic intervals, and for deactivating said power supply during at least a portion of each interval when said sending transducer is deactivated; and
capacitive means for activating said receiving transducer and said receiving amplifier when said power supply is deactivated so that said receiving amplifier is not affected by power supply noise.

11. The ultrasonic instrument of claim 10 wherein said signal processing means comprises means for determining an information-yielding parameter of an ultrasonic pulse travelling through a medium located between said sending transducer and said receiving transducer.

12. The ultrasonic instrument of claim 11 wherein said means for determining said information-yielding parameter comprises means for determining velocity of said ultrasonic pulse travelling through said medium.

13. The ultrasonic instrument of claim 10 further including means for enabling a fluid medium to flow in a region adjacent said sending transducer and said receiving transducer, said sending and receiving transducers being disposed so that an ultrasonic pulse transmitted by said sending transducers passes through said fluid medium before being received by said receiving transducer; said signal processing means comprising means for determining an information-yielding parameter of said ultrasonic pulse travelling through said fluid medium.

14. The ultrasonic instrument of claim 13 wherein said means for determining said information-yielding parameter comprises means for determining velocity of said ultrasonic pulse travelling through said fluid medium.

15. The ultrasonic instrument of claim 14 wherein said signal processing means further comprises means for detecting differences in velocity for successive ultrasonic pulses through said fluid medium.

16. The ultrasonic instrument of claim 10 wherein said switching means comprises a strobe device.

17. The ultrasonic instrument of claim 10 wherein said capacitive means comprises a filter capacitor.

18. An ultrasonic instrument for providing information about a specimen through which ultrasonic signals can be transmitted, said instrument comprising means for sending and receiving ultrasonic signals, electronic amplification means for amplifying received signals to a level suitable for processing to provide said information, a power supply for activating said sending and receiving means and said amplification means, strobe switching means for activating said power supply during periodic intervals so as to provide intervening spans of time when said power supply is inactive, and capacitive means for activating said amplification means when said power supply is deactivated.

19. An ultrasonic instrument for obtaining information about a specimen from which ultrasonic signals can be reflected, said instrument comprising means for sending and receiving ultrasonic signals, electronic amplification means for amplifying received signals to a level suitable for processing to provide said information, a power supply for activating said sending and receiving means and said amplification means, strobe switching means for activating said power supply during periodic intervals so as to provide intervening spans of time when said power supply is inactive, and capacitive means for activating said amplification means when said power supply is deactivated.

* * * * *